(12) United States Patent
Nakamura et al.

(10) Patent No.: US 9,097,814 B2
(45) Date of Patent: Aug. 4, 2015

(54) PHOTOELECTRIC SENSOR AND METHOD FOR AIDING OPERATIONAL CHECKING OF PHOTOELECTRIC SENSOR

(75) Inventors: Hideyoshi Nakamura, Ayabe (JP); Atsushi Iwamoto, Ayabe (JP); Koji Kosaka, Ayabe (JP)

(73) Assignee: OMRON CORPORATION, Kyoto (JP)

( * ) Notice: Subject to any disclaimer, the term of this patent is extended or adjusted under 35 U.S.C. 154(b) by 1026 days.

(21) Appl. No.: 13/022,988

(22) Filed: Feb. 8, 2011

(65) Prior Publication Data

US 2011/0215221 A1  Sep. 8, 2011

(30) Foreign Application Priority Data

Mar. 5, 2010  (JP) .................................. 2010-049720

(51) Int. Cl.
| | | |
|---|---|---|
| G01J 1/44 | (2006.01) |
| G01V 8/10 | (2006.01) |
| G01V 8/20 | (2006.01) |
| G01V 8/12 | (2006.01) |
| G01V 8/16 | (2006.01) |

(52) U.S. Cl.
CPC ... *G01V 8/10* (2013.01); *G01V 8/12* (2013.01); *G01V 8/16* (2013.01); *G01V 8/20* (2013.01)

(58) Field of Classification Search
CPC ............. G01V 8/10; G01V 8/12; G01V 8/16; G01V 8/20
USPC ............ 250/206, 221, 223 R, 559.12, 559.13
See application file for complete search history.

(56) References Cited

U.S. PATENT DOCUMENTS

| | | | |
|---|---|---|---|
| 5,142,160 A | 8/1992 | Storbeck | |
| 5,281,810 A * | 1/1994 | Fooks et al. | 250/222.1 |
| 5,808,296 A * | 9/1998 | McMonagle et al. | 250/221 |
| 6,388,573 B1 * | 5/2002 | Smith et al. | 340/556 |
| 6,555,806 B2 * | 4/2003 | Okamoto | 250/221 |
| 6,950,778 B2 * | 9/2005 | Warner et al. | 702/182 |
| 7,569,843 B2 * | 8/2009 | Lohmann | 250/559.4 |
| 2003/0071197 A1 * | 4/2003 | Sugiyama | 250/214 A |
| 2003/0136895 A1 * | 7/2003 | Ogawa | 250/205 |
| 2004/0041084 A1 * | 3/2004 | Carlson | 250/221 |

(Continued)

FOREIGN PATENT DOCUMENTS

| | | |
|---|---|---|
| JP | H11-248855 A | 9/1999 |
| JP | 2003-318718 A | 11/2003 |

(Continued)

OTHER PUBLICATIONS

Patent Abstracts of Japan, Publication No. 2005-181343, Publication Date: Jul. 7, 2005, 1 page.

(Continued)

*Primary Examiner* — Georgia Y Epps
*Assistant Examiner* — Kevin Wyatt
(74) *Attorney, Agent, or Firm* — Osha Liang LLP (57) ABSTRACT

A photoelectric sensor comprises a control unit which is configured to store in a memory data on the amount of received light input from a light-receiving unit or measurement data obtained by a measuring process, and to perform a sampling process in which the data stored in the memory are read at fixed intervals as sampling data, the sampling process being performed within a limited reading period. Further, the control unit outputs the thus read sampling data so as to correspond to the order in which they are stored in the memory.

11 Claims, 9 Drawing Sheets

(56) References Cited

U.S. PATENT DOCUMENTS

2004/0124337 A1* 7/2004 Gondo et al. ............ 250/214 A
2005/0094920 A1* 5/2005 Kamei et al. .................... 385/12

FOREIGN PATENT DOCUMENTS

JP 2004-104612 A 4/2004
JP 2005-181343 A 7/2005

OTHER PUBLICATIONS

Patent Abstracts of Japan, Publication No. 2004-104612, Publication Date: Apr. 2, 2004, 1 page.
Extended European Search Report issued in European Application No. 11152946.7, mailed on Jun. 30, 2014 (6 pages).

* cited by examiner

Fig. 9B (a) Change in amounts of received light (b) Displayed graph

Fig. 10A

Fig. 10B (a) Change in amounts of received light (b) Result of differentiating amounts of received light On-period (c) Displayed graph

PHOTOELECTRIC SENSOR AND METHOD FOR AIDING OPERATIONAL CHECKING OF PHOTOELECTRIC SENSOR

BACKGROUND

1. Technical Field

The present invention relates to a photoelectric sensor used for, for example, detecting the passage of a moving object through a target location or detecting a change in the orientation of an object. The present invention also relates to a method for aiding the operational checking of a photoelectric sensor.

2. Description of the Related Art

Examples of photoelectric sensors include a type (transmission type) that receives light emitted from a light-projecting unit and passed through an area for detecting an object to be detected (hereinafter referred to as a detection target), and a type (reflection type) that receives light emitted from a light-projecting unit and then reflected by a detection target. The sensors of both types convert a signal indicating an amount of received light, output from a light-receiving unit, into digital data and input the converted data (hereinafter referred to as "data on an amount of received light") into a processing circuit that incorporates a microprocessor. Then, these sensors compare the value of the data on the amount of received light with a preset threshold to determine the presence or absence of a detection target. They subsequently output a detection signal indicating an ON-state if the presence of the detection target is detected.

Depending on the purpose of the use of each sensor, instead of comparing an amount of received light with a threshold, the sensor may perform the process of calculating the change or the moving average of amounts of received light and compare the value obtained from this process with a threshold.

To stably detect a detection target with a photoelectric sensor of any type, it is preferable to check how the measurement data to be compared with a threshold changes in accordance with object movement and then to set the threshold. However, if detection targets move at high speed, signals indicating the amount of received light and data obtained from such signals change very fast, and it is very difficult to check such changes.

To overcome such a drawback, some conventional photoelectric sensors are designed such that the maximum and minimum amounts of received light detected within a predetermined period of time are discerned and they are displayed side by side, enabling a user to check the degree of signal change resulting from the movement of a detection target (see, for example, Japanese Patent Application Laid-Open Nos. 2005-181343 and 2004-104612).

SUMMARY

In accordance with one aspect of the present invention, a photoelectric sensor is applied includes: a light-projecting unit for projecting light; a light-receiving unit for receiving light projected from the light-projecting unit and generating data on an amount of received light; an output unit for outputting a detection signal indicating that a detection target has been detected; and a signal processing unit for receiving the data on the amount of received light generated by the light-receiving unit, performing a measuring process for the data on the amount of received light, comparing measurement data obtained by the measuring process with a predetermined threshold to determine whether a detection target is present or not, and switching between ON and OFF states of the detection signal according to a result of the determination.

In the foregoing configuration, the light-receiving unit may directly receive light emitted by a light-projecting element (transmission type) or may receive light that is emitted by a light-projecting element and then reflected by an object (reflection type). The signal processing unit performs the measuring process, for example, by measuring every time or every fixed time a datum on an amount of received light, input by the light-receiving unit. Furthermore, the signal processing unit can perform an analyzing process such as calculating a change in an amount of received light per unit time by differentiating the data on the amount of received light, obtained by this measurement, or calculating a moving average of the data on the amount of received light.

The signal processing unit includes: storage means for storing the data on the amount of received light input from the light-receiving unit or the measurement data captured by the measuring process; sampling means for performing a sampling process in which the data on the amount of received light or the measurement data stored in the storage means are read as sampling data at fixed intervals, the sampling process being performed during a limited reading period; and output means for outputting the sampling data, read by the sampling means, in association with order in which the sampling data are stored in the storage means.

Incidentally, the number of sampling data read by the sampling means may be at least three, but it is preferable that the number be significantly larger than three. For example, it is preferable that the number of sampling data be determined on the basis of sampling intervals or the number of data stored in the storage means within the time taken for a detection target to make a required movement.

The photoelectric sensor according to an embodiment includes a display unit for digitally displaying values of the sampling data. The output means is configured to serve as means for displaying on the display unit the sampling data to be output in the order in which they are read from the storage means.

In an embodiment whose conceptual focus is narrower than that of the foregoing embodiment, the output means is configured such that the sampling data to be output are displayed on the display unit in order and over a time exceeding a time required for these data to be stored in the storage means.

Another embodiment of the photoelectric sensor including the display unit able to digitally display the values of the sampling data further includes an operating unit for receiving an operation for specifying content of processing. The output means performs: displaying on the display unit the value of a sampling datum to be output first, and then reading from the storage means a sampling datum to be subsequently output each time the operating unit receives an operation commanding the display of the subsequent sampling data; and switching a content displayed on the display unit to the value of the read sampling datum.

In the embodiment described above, the operating unit may be configured so as to receive an operation commanding the display of a subsequent sampling data and an operation commanding the display of a previous sampling data. Due to this configuration, the output means is configured such that when one of values of second and subsequent sampling data to be output are displayed on the display unit and the operating unit performs an operation commanding the display of the previous display content, the display content is updated by a value of the sampling datum immediately preceding the currently displayed sampling data.

The photoelectric sensor according to another embodiment includes a display unit for displaying a graph. In addition, the output means reads a plurality of sampling data from the storage means and displays time-series changes in values of these data on the display unit.

The photoelectric sensor according to another embodiment further includes an operating unit for receiving an operation commanding specifying the content of processing, and the output means is configured to serve as means for communicating with an external device that can display a graph. The output means outputs the plurality of sampling data read from the storage means in association with the order in which these sampling data are stored in the storage means.

In another embodiment of the photoelectric sensor, the output means analyzes the data stored in the storage means, thereby specifying a period of time that a signal change satisfying a predetermined condition arises, and sets the sampling data included in this period as an output target.

One aspect of the present invention is applied to a method to aid checking of a detecting operation of a photoelectric sensor. The photoelectric sensor includes: a light-projecting unit for projecting light; a light-receiving unit for receiving light projected from the light-projecting unit and generating data on an amount of received light; an output unit for outputting a detection signal indicating that a detection target has been detected; and a signal processing unit for receiving the data on the amount of received light generated by the light-receiving unit, performing a measuring process for the data on the amount of received light, comparing measurement data obtained by the measuring process with a predetermined threshold to determine whether a detection target is present or not, and switching between ON and OFF states of the detection signal according to a result of the determination.

The method includes: operating the photoelectric sensor while a detection target is moving through a detecting area of the photoelectric sensor and simultaneously causing the signal processing unit of the photoelectric sensor to store in a memory data on an amount of received light input from the light-receiving unit or measurement data obtained by the measuring process; and performing a sampling process in which the data on the amount of received light or the measurement data stored in the memory are read as sampling data at fixed intervals, the sampling process being performed during a limited reading period.

The method further includes causing a display unit integrally provided to the photoelectric sensor or a display device externally provided to the photoelectric sensor to display values of the sampling data read from the memory, the values being displayed in association with the order in which these data are stored in the memory.

DETAILED DESCRIPTION

In a conventional photoelectric sensor which simply displays the maximum and minimum amounts of received light, it is difficult to set an appropriate threshold.

For example, if an object of complex shape is a detection target, the pattern of change in the amount of received light may become complicated during the passage of the detection target through a detecting area of the sensor. Even if an amount between the maximum and minimum amounts is set as a threshold, part of a complex change may deviate from the detecting range for that threshold, making it difficult to reliably detect a detection target.

The maximum and minimum amounts of received light may not always be detected as a detection target moves, and noise may occur. It is difficult to determine from the display of only the maximum and minimum amounts of received light whether they result from noise or not. In addition, if they result from noise and this is not recognized, a threshold deviating from a value appropriate for detection may be set.

For such a reason, a user may set a threshold by trial and error, increasing the burden on him or her.

Further, there is a demand that changes in data should be noted in detail not only for setting a threshold but also for checking whether a detection target moving at high speed has been detected correctly.

The following embodiments address the above-mentioned problems, and aim to enable a user to easily check measurement data changes caused by the movement of a detection target at high speed.

Figure 1:
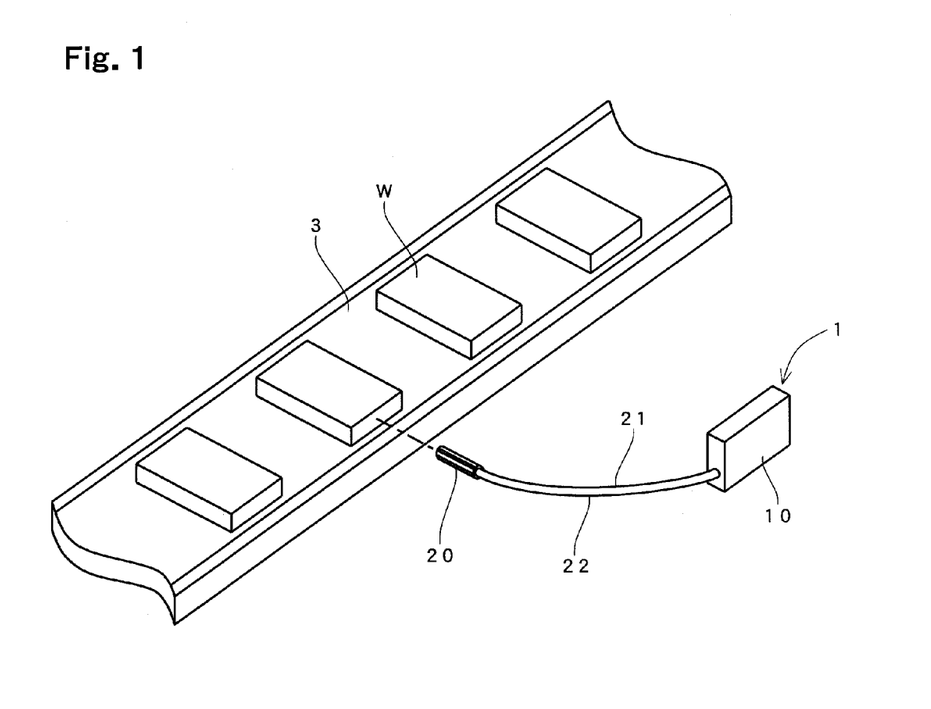
FIG. 1 shows an example of the use of a photoelectric sensor to which the present invention is applied.

FIG. 1 shows an example of the use of a photoelectric sensor to which the present invention is applied.

The photoelectric sensor 1 according to the present example is a reflection type sensor in an optical fiber system. The sensor 1 is installed near a factory production line 3 in order to detect works W (for example, electronic components) being conveyed on the line 3.

Figure 4:
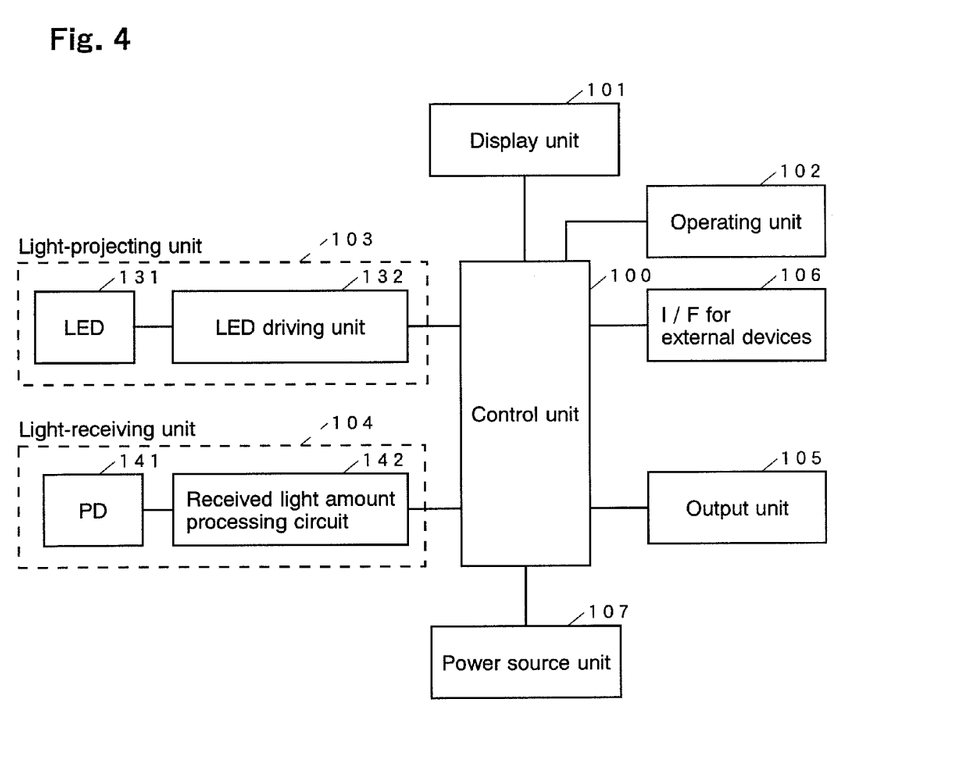
FIG. 4 is a block diagram showing the circuit configuration of the photoelectric sensor.

In order to detect a work W, a light-projecting optical fiber 21 and a light-receiving optical fiber 22 are drawn out from the main body of the photoelectric sensor 1. The leading ends of the optical fibers 21 and 22 are connected to a common head portion 20. Disposed near openings in the main body of the photoelectric sensor 1, in which the fibers 21 and 22 are inserted, are an LED 131 and a photodiode (PD) 141, which are shown in FIG. 4. Light emitted from the LED 131 is further emitted from the head portion 20 via the light-projecting fiber 21. In addition, when light reflected from a work W, which corresponds to this emitted light, is made incident on the head portion 20, the incident light is guided to the photodiode 141 via the light-receiving fiber 22. Consequently, the amount of received light by the photodiode 141 increases.

A processing circuit in the photoelectric sensor 1 detects the increase in the amount of received light and outputs a signal indicating the result of the detection (i.e., a detection signal) to a device for performing a process with the work W (for example, a visual sensor for inspecting a work).

Figure 2:
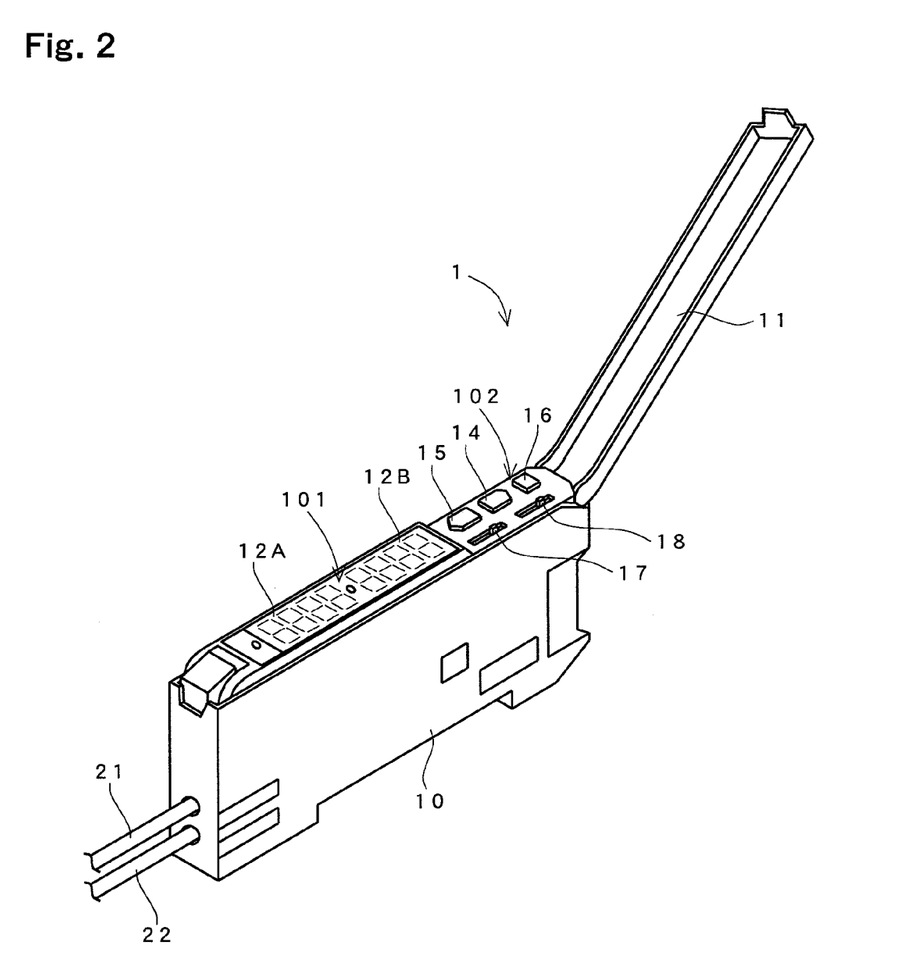
FIG. 2 is a perspective view showing the appearance of the photoelectric sensor.

FIG. 2 shows the appearance of the main body of the foregoing photoelectric sensor 1. The main body of the photoelectric sensor 1 includes a case body 10 with a lid portion 11 at the top thereof. While the optical fibers 21 and 22 are drawn out from the front of the case body 10, a cord line (not shown) is drawn out from the rear thereof. The top of the case body 10 has a display unit 101 and an operating unit 102, which are, however, covered with the lid portion 11 when the sensor 1 is in operation.

Figure 3:
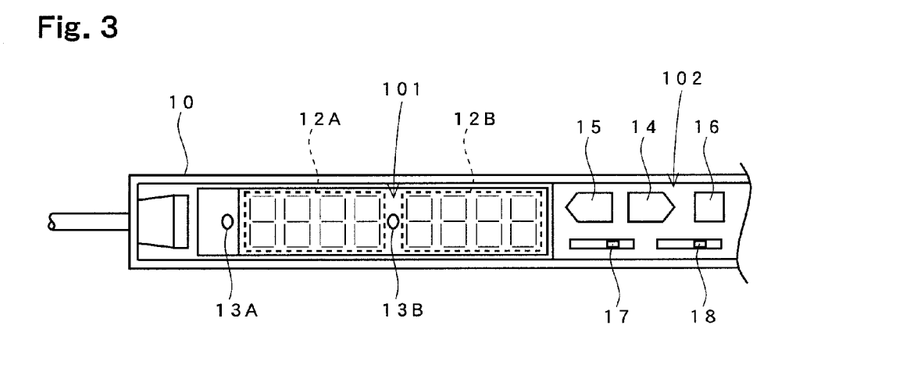
FIG. 3 is a plan view showing the top of the case body of the photoelectric sensor.

FIG. 3 is a plan view showing the configuration of the display unit 101 and the operating unit 102. The display unit 101 has two digital displays, 12A and 12B, each of which displays a four-digit number. On the left side of the digital displays 12A and 12B are operating lamps 13A and 13B, respectively. In addition to numbers, each of the digital displays 12A and 12B may display a character string incorporating the alphabet.

The operating unit 102 includes three push button switches, 14, 15, and 16, and two slide switches, 17 and 18.

Of these push button switches 14 to 16, the middle one 14 and the left one 15 are in the shape of an arrow indicating a rightward direction and the shape of an arrow indicating a leftward direction, respectively, and are used to switch the display contents of the displays 12A and 12B to a setting mode or to change a set value. For changing a set value, the switch 14 also has the function of increasing a value whereas the switch 15 has the function of decreasing a value. Accordingly, hereinafter these switches 14 and 15 will be referred to as an "UP switch 14" and a "DOWN switch 15."

The push button switch 16 on the right side is used for settling the value displayed on the displays 12A and 12B or to select a function recalled by the UP switch 14 or DOWN switch 15. Hereinafter, this switch 16 will be referred to as a "setting switch 16."

The slide switch 17 selects either a setting mode or a measuring mode as an operating mode for the photoelectric sensor 1. Based on output from the photoelectric sensor 1, the other slide switch 18 selects a mode (a light-on mode) for turning on output when the data on the amount of received light exceeds the threshold and a mode (a dark-on mode) for turning on output when the data on the amount of received light decreases below the threshold.

FIG. 4 shows the configuration of the circuit in the photoelectric sensor 1 described above.

The display unit 101 shown in FIG. 4 includes the digital displays 12A and 12B and the operating lamps 13A and 13B shown in FIG. 3. The operating unit 102 includes the UP switch 14, the DOWN switch 15, the setting switch 16, and the slide switches 17 and 18, which are also shown in FIG. 3. The case body 10 accommodates a control unit 100, a light-projecting unit 103, a light-receiving unit 104, an output unit 105, an interface 106 for external device or devices, and a power source unit 107.

The light-projecting unit 103 includes the LED 131 and a driving circuit (LED driving circuit) 132 for the same. In addition to the photodiode (PD) 141, the light-receiving unit 104 includes a circuit for processing a signal indicating the amount of received light after output from the photodiode (hereinafter referred to as the received light amount processing circuit 142). The received light amount processing circuit 142 includes an amplifying circuit, an A/D conversion circuit, and the like. These circuits convert a signal indicating an amount of received light into a value that is in the range of 0 to 4000, and then output the converted signal.

The control unit 100 includes a microprocessor, which incorporates a CPU and a nonvolatile memory. Not only are programs stored in the memory, but also parameters (such as a threshold) set by a user are registered in this memory. While controlling the light-emitting operation of the light-projecting unit 103 on the basis of the programs and parameters, the CPU receives digital data (hereinafter referred to as "data on the amount of received light") generated as a result of the conversion process performed by the received light amount processing circuit 142, then compares the input data indicating the amount of received light with the threshold, and determines the presence or absence of a detection target. The memory of the control unit 100 in this example includes an area in which data on the amount of received light, input during a fixed period of time in the past, are stored in a First-In-First-Out scheme.

The output unit 105 is configured such that a signal indicating the result of the determination described above (the detection signal) is output to the outside. The interface 106 for any external devices is used for exchanging information with a setting device 200, which will be described later.

The power source unit 107 is connected to an external power source (not shown), and supplies each unit with drive power by using power supplied from the external power source.

To operate a photoelectric sensor 1 with the foregoing configuration, a user first performs a detecting process while allowing a work W to move as a trial model, with the slide switch 17 set in the setting mode. Then, using the operating unit 101, the user inputs a setting for a threshold. After completing the setting, the user sets the slide switch 17 to the measuring mode. Thereby the control unit 100 starts a detecting operation based on the threshold set.

Further, in this example, a change in signal indicating the amount of received light resulting from the movement of a work W is displayed in detail on the display unit 101 in the setting mode, thereby enabling the user to check whether the work has been correctly detected or aiding the user in his or her determining whether the set threshold is appropriate or not.

Figures 5A, 5B:
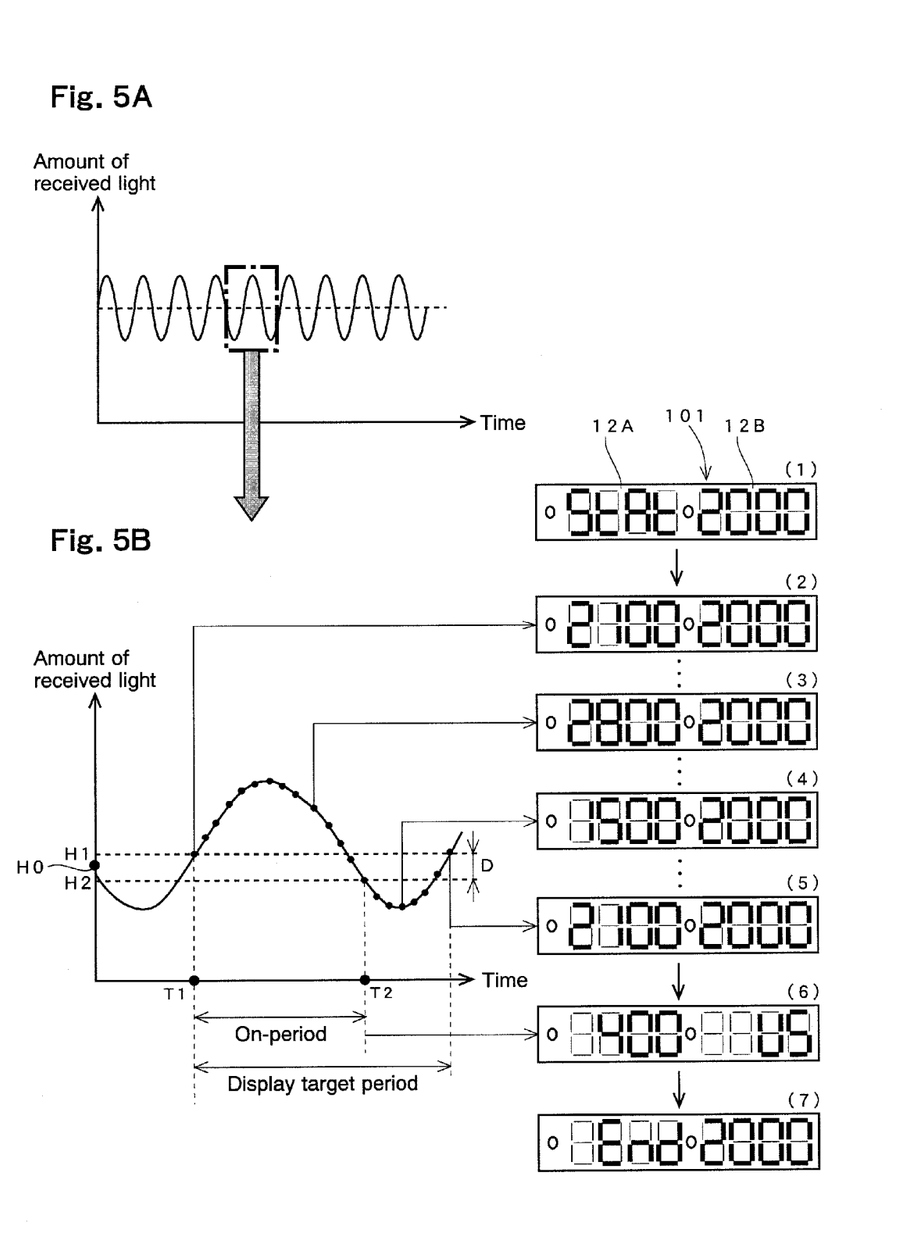
FIG. 5A shows an example of signal indicating the amount of received light, which may take place during movement of a work.
FIG. 5B is a view explaining an example of sampling and displaying processes for data on the amount of received light.

FIG. 5A shows any change in signal indicating the amount of received light, which may take place during the period of time that a plurality of works W pass through a detecting area of the photoelectric sensor 1. Each one of a series of undulations of the signal corresponds to a corresponding work W. However, since the works W in this example move at high speed, the signal indicating the amount of received light also changes very fast. Therefore, even if the signal indicating the amount of received light is displayed in real time, it is difficult for a human to check changes in signal corresponding to each work W with the naked eye.

To avoid the problem, the control unit 100 according to the present example performs a sampling process on the data on the amount of received light in response to a signal-capture operation performed by a user in a setting mode. Here, the data on the amount of received light are stored in the memory after being input from the received light amount processing circuit 142 within a fixed period of time after the signal-capture operation. Specifically, from among the data on the amount of received light stored in the memory after signal-capture operation, the control unit 100 specifies a data group indicating a change in the amount of received light, which change takes place during the passage of one work W through the detecting area. Subsequently, the control unit 100 reads (as sample data) data on the amount of received light which data correspond to a fixed period of time and include the specified data group. Then, the control unit 100 displays the information on the display unit 101.

In FIG. 5A, an area corresponding to the specified data group as a display target in a graph which represents a signal indicating the amount of received light is surrounded by a frame in bold. FIG. 5B shows the signal indicating the amount of received light, surrounded by the bold frame, such that intervals on the axis corresponding to time are expanded. On the right side of the enlarged graph shown are examples of displays of the data on the amount of received light, sampled from this signal. In the graph representing the amount of received light, a position corresponding to each of the sampling data is shown by a dot. In addition, arrows relate the display contents (2), (3), (4), and (5) to the positions of the corresponding sampling data.

In the examples of display contents shown in FIG. 5B, the digital display 12A on the right side shows a current set threshold (2000 in the illustrated example), and the digital display 12B on the left side shows data on the amount of received light.

Taking the effects of noise into account, the photoelectric sensor 1 according to the present example utilizes three thresholds H0, H1, and H2, thereby detecting the presence or absence of a detection target. In the examples of the display content shown in FIG. 5B, a value 2000 shown on the display 12B represents the threshold H0. Although H0 is set to 2000 as a default value, a user may change that value.

The other thresholds H1 and H2 (H1>H2) are set on the basis of H0 with a predetermined distance D apart from each other such that H0 is located in the middle between H1 and H2.

In the measuring mode, the control unit 100 switches a detection signal from OFF to ON when the input data on the amount of received light exceeds H1, and switches it from ON to OFF when the input data on the amount of received light decreases below H2. In view of this, in the setting mode also, the control unit 100 specifies a fixed period including the period of time that a detection signal is brought into an on-state based on the current thresholds H0 to H2 among the data on the amount of received light stored in the memory. Then, the control unit 100 sequentially reads data on the amount of received light that are included in this period, and displays the data on the display 12A. Further, in this example, a user switches the display content by performing a specifying operation (operating the UP switch 14).

Figure 6:
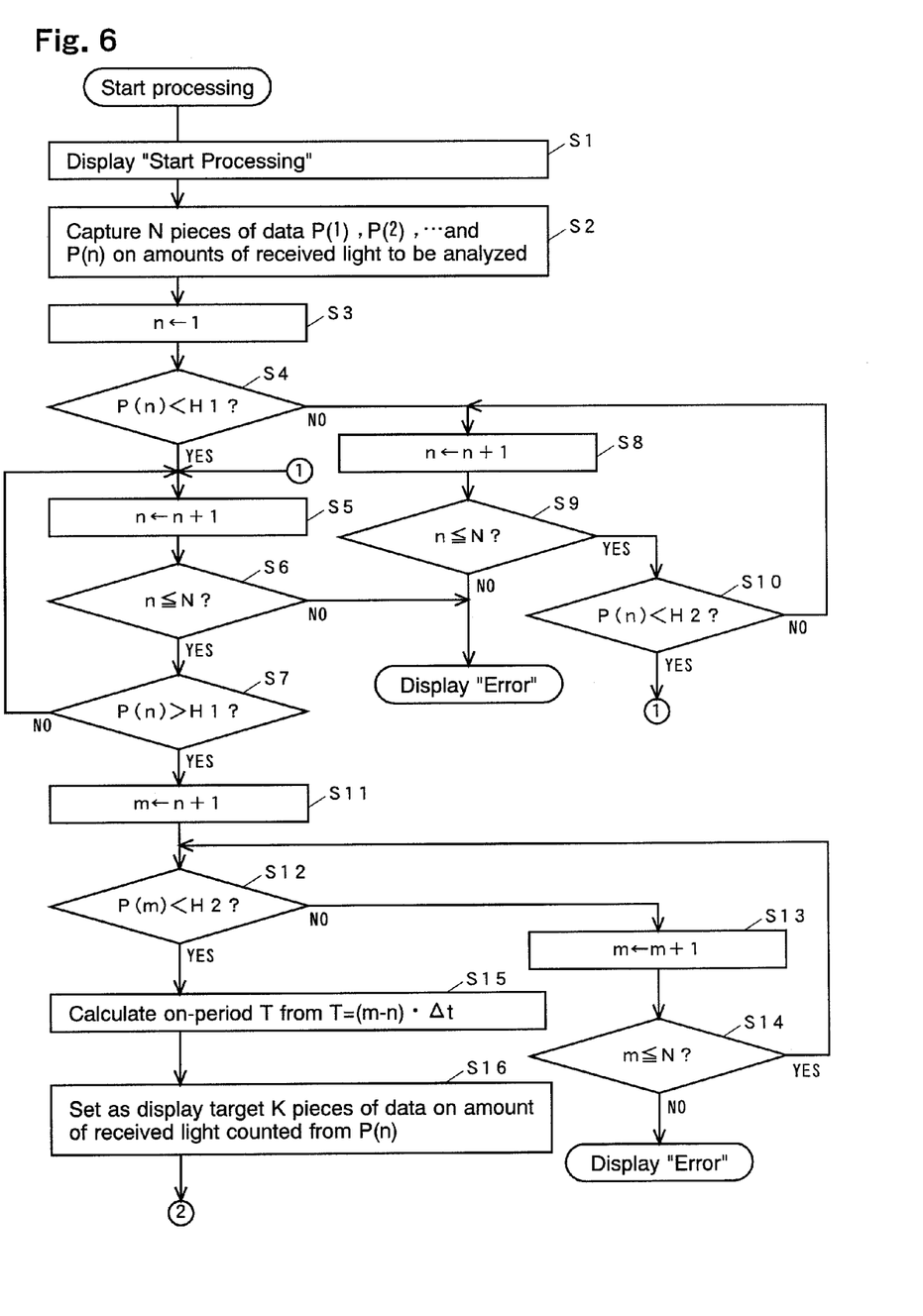
FIG. 6 is a flowchart illustrating a procedure for sampling and displaying processes for the data on the amount of received light.
Figure 7:
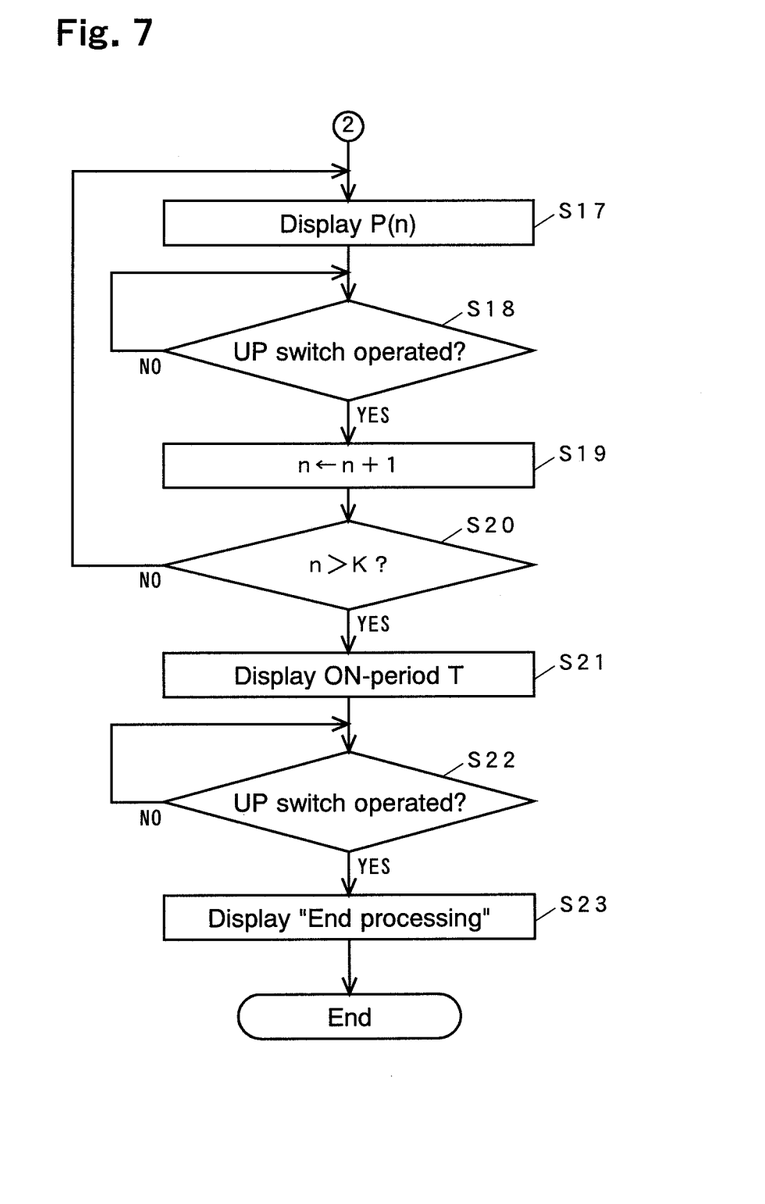
FIG. 7 is a flowchart illustrating a procedure (continued from FIG. 6) for the sampling and displaying processes for the data on the amount of received light.

FIGS. 6 and 7 illustrate the procedure for a sampling process for the amount of received light and for a display process for sampling data. The processes illustrated in the flowchart will now be described with reference, if necessary, to the graph and display contents (1) to (7) shown in FIG. 5B.

This process starts in response to the user's operation commanding to start the capture of data. First, in step S1, the process shows on the display unit 101 instructions to start the sampling process. The display content (1) in FIG. 5B shows an example of the display content at this point in time. The display 12A shows a character string "StAt," which represents the meaning of "START."

In step S2, N pieces of data P(1), P(2) and P(N) on amounts of received light to be input later are captured in order as data to be analyzed, and they are stored in the memory. Based on intervals Δt at which data on the amount of received light are captured and the speed at which works W are moved, the value N is set in advance so as to obtain a value sufficiently greater than the number of data able to be captured during the passage of each work W through the detecting area.

When the N pieces of data on the amount of received light are stored in the memory by the process of step S2, the processing in subsequent steps S3 to S10 specifies data on the amount of received light which correspond to the period of time that the detection signal is brought into an ON-state (hereinafter referred to as "ON period").

The specifying process will be described in detail below.

First, using a counter n, the first datum P(1) on the amount of received light is brought into focus in order to compare the value of this datum (P1) with the threshold H1 (steps S3 and S4). In this case, if P(1)<H1 (n=1 and "YES" in step S4), that is, if the capture of the data on the amount of received light is started with a detection signal brought into an OFF-state, the second and subsequent data on the amounts of received light are sequentially brought into focus in order to search for a datum P(n) larger than the threshold H1 (step S5 to S7).

If the first datum P(1) on the amount of received light is larger than the threshold H1 (n=1 and "NO" in step S4), that is, if the capture of the data on the amount of received light is started with a detection signal brought into an ON-state, the second and subsequent data on the amount of received light are sequentially brought into focus in order to search for a datum P(n) on the amount of received light smaller than the threshold H2 (step S8 to S10). If a datum P(n) on the amount of received light is found which satisfies the condition ("YES" in step S10), steps S5 to S7 are performed based on the value n obtained at the time. Thus, the datum P(n) larger than the threshold H1 is found.

The value n when the datum P(n) larger than the threshold H1 is specified in the loop of steps S5 to S7 corresponds to a time when the detection signal switches from OFF to ON. That is, it corresponds to a point T1 on the axis corresponding to time in the graph of FIG. 5B. Hereinafter, this point will be referred to as a "detection start point."

After the detection start point is specified, a second counter m is used to sequentially focus on datum P(m) on the amount of received light obtained after the detection start point. Thereby, a datum P(m) on the amount of received light smaller than the threshold H2 is sought (steps S11 to S14).

The value m when the datum P(m) on the amount of received light is found which satisfies the foregoing condition ("YES" in step S12) corresponds to a time when the detection signal is switched from ON to OFF. That is, this value corresponds to a point T2 on the axis corresponding to time in the graph of FIG. 5B. Hereinafter this point is referred to as a "detection end point."

In step 15, using the counter n representing the detection start point, the counter m representing the detection end point, and the intervals Δt at which data on the amount of received light is captured, a computing equation T=(m−n)×Δt is calculated to obtain the length T of the period (ON-period) for which the ON-state of the detection signal is maintained. Hereinafter, T is referred to as an "ON-period."

Furthermore, in step S16, K (K>m−n) pieces of data on the amount of received light, which are counted from P(n), are set as display objects. The value K is predetermined. However, if necessary, it may be altered in accordance with the number of pieces of data on the amount of received light after the P(m). Thus, a display target period as shown in the graph of FIG. 5B is set.

In step S17, the first datum P(n) among the data on the amount of received light which are set as display targets are read from the memory and displayed. This state is shown as the display content (2) in FIG. 5B.

Thereafter, each time that the UP switch 14 is operated, the value n is increased (steps S18 and 19). Then, step S17 described above is performed, whereby the data on the amount of received light stored in the memory are read and displayed in the order in which the data are stored in the memory. As a result of this process, the value shown on the display 12A variously changes in accordance with the operation of the UP switch 14, as shown in the display contents (3) (4) and (5) of FIG. 5B.

When the UP switch 14 is operated (n=K and "YES" in step S18) while the last item of the displayed data on the amount of received light is shown(i.e., the display content (5) in FIG. 5B), the value n is increased accordingly (step S19). Consequently, the thus-increased value n exceeds K. As a result, the loop of steps S17 to 20 ends and, in step S21, the display unit 101 is switched to show an ON-period T.

The display content (6) in FIG. 5B shows an example of the display content for this ON-period. The left display 12A shows a value indicating an ON-period T and the right display 12B shows a character string "US" representing the unit of T. It should be noted that the character U in the display represents "μ" Specifically, the display content (6) shows an ON-period of 400 μs.

Furthermore, when the UP switch 14 is operated ("YES" in step S22), the display content of each display 12A or 12B is switched (step S23). The display content (7) in FIG. 5B shows an example of the display content wherein a character string "End" is shown by the left display 12A. The right display 12B returns to show the threshold H0 again. The shown display content informs a user of the end of the processes. Correspondingly, a series of processes ends.

In one of the loop of Steps S5 to S7 for specifying the detection start point, the loop of steps S8 to S10, and the loop of steps S12 to S14 for specifying the detection end point, if the counter n exceeds N without obtaining data on the amount of received light which satisfy the condition ("No" in step S6, S9, or S14), the process is discontinued and the procedure for error display "E" is run. For example, the display 12A shows a character string that is code for error.

In this example, while the second and subsequent data of the display target data on the amount of received light are shown, the display content in the display 12A can be returned to the previous one in accordance with the operation of the DOWN switch 15. This process is not shown in the foregoing flowchart in order to avoid complicating the flowchart.

The foregoing series of processes enables a user to check at his or her own pace detailed time-series changes in the amount of received light, which result from the passages of works W. In addition, the current value of the threshold H0 is shown next to the display of the amount of received light. Accordingly, by comparing these, the user can easily determine whether the setting for the threshold H is appropriate or not.

In addition, if a datum on the amount of received light contains an abnormal value due to noise, the user can easily recognize such an abnormal value from the relationship between the display contents before and after the occurrence of the abnormal value.

Further, in this example, after data on amount of received light are shown, the value of an ON-period T is shown. Accordingly, from the number of displays of data on the amount of received light and the length of the ON-period T, a user can determine whether a sufficient number of pieces of data have been obtained in order to detect works W.

In the processes illustrated in FIGS. 6 and 7, the displaying of data on amount of received light is started at the detection start point T1. However the invention is not limited thereto. The displaying may be started slightly before the detection start point T1.

In the example described above, the amounts of received light within a period of time slightly longer than the period corresponding to the passage of one work, is used as a display object. However, the display object may include the amounts of received light within a more longer period; that is, within a period corresponding to the time required for the passage of two or more works W.

In the example described above, data on the amount of received light which are stored in the memory after the capturing operation are checked without being thinned, and all the data on the amount of received light which are detected within a period specified as a display target, are sampled. However, in order to extend the intervals of the display target, checking or sampling of data on the amount of received light may be set so as to occur at intervals of two or more data.

In the example described above, values indicating each amount of received light are displayed digitally. Alternatively, the display unit 101 may be formed from very small LEDs or the like arrayed devices so as to form a bar graph. The bar graph may be such that bars corresponding to data on the amount of received light, which are captured within a fixed period of time, are arranged in order of sampling. In this case, if all data cannot be displayed simultaneously, the bar graph display may be scrolled in accordance with the operation of the UP switch 14 or the DOWN switch 15.

The example described above runs the procedure illustrated in FIGS. 6 and 7 in accordance with a data capture operation performed by a user. However, the example is not limited thereto; The processes in FIGS. 6 and 7 may be started in response to a setting mode originally set with the threshold as a default value or in response to selection from a menu for changing the threshold setting.

Furthermore, the photoelectric sensor 1 according to the present example can sample or display data on the amount of received light according to the data capture operation even in the measuring mode.

In the measuring mode, data on the amount of received light captured immediately after being input (i.e., fresh data) are displayed on the left digital display 12A, and sampling data are displayed on the right digital display 12B.

In addition, the display content of the display 12A can be switched at high speed according to the data actually input. However, on the display 12B, data on the amount of received light captured during a fixed period of time specified in the same manner as that in steps S1 to S16 in FIG. 6 are sequentially shown over a period that is sufficiently longer than the time required to input and store these data (i.e., time sufficient for a human to view them). Even where works W move at a high speed, displaying sampling data on the display 12B in such a manner makes it easy for a user to check any changes in the amount of received light resulting from the movement of the works W. This also makes it easy for the user to determine whether the works W have been correctly detected or not.

Even in the measuring mode as in the setting mode, the display contents of the display 12B may be switched according to the operation of the UP switch 14 or the DOWN switch 15.

Additionally, data on the amount of received light do not have to be shown on the main body of the photoelectric sensor 1. For example, by connecting a setting device to the interface 106 for external devices as shown in FIG. 4, sampling data obtained by sampling the data on the amount of received light in the control unit 100 can be transmitted in order of sampling. In other words, the data can be transmitted to the setting device so as to correspond to the order of storage in memory, enabling the setting device to display the data with preferable visibility.

Figure 8:
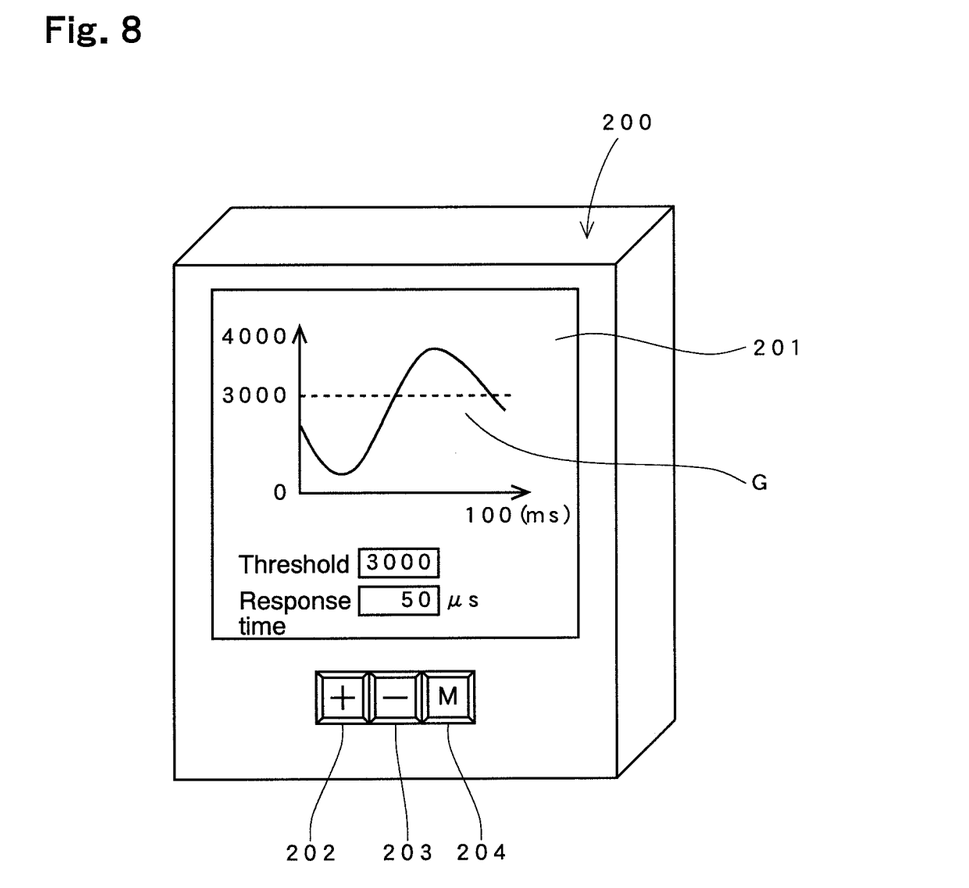
FIG. 8 is a view illustrating a display example of a graph representing data on an amount of received light sampled by an external device.

FIG. 8 shows a display example of a setting device 200 to which data on the amount of received light has been transmitted.

The front of the setting device 200 according to the present example includes a monitor 201 with a liquid crystal panel, and three push button switches 202, 203, and 204. The device body incorporates a circuit for communicating with the photoelectric sensor 1, a control unit that includes a microprocessor, and the like. Functions similar to those of the switches 14, 15, and 16 in the photoelectric sensor 1 are set for the switches 202, 203, and 204, and the content set by each switch is transmitted to the photoelectric sensor 1.

Based on data on the amount of received light output from the photoelectric sensor 1, the control unit of the setting device 200 displays on the monitor 201 a graph G showing time-series change in the amount of received light with a curved line. In the graph G, the current value (3000) of the threshold H0 is shown by a dotted line. Furthermore, below the graph G shown are the threshold H0 and response time (corresponding to intervals ΔT at which data on the amount of received light are captured).

While checking the foregoing display contents, a user can change a set threshold using the switches 202 and 203 and can also determine the set threshold using the switch 204.

In the case where data may be displayed with sufficient visibility as shown in FIG. 8, a graph using all data on the amount of received light stored in the memory of the photoelectric sensor 1 may be shown without decreasing the to-be-displayed data on the amount of received light stored in the memory. In addition, the amounts of received light during a period corresponding to the passage of a plurality of works W may be sampled and all the sampling data may be displayed on a graph.

Further, if the setting device 200 has the function of communicating with other devices (such as a personal computer), the setting device 200 may be utilized to analyze in detail the signal indicating the amount of received light generated by the photoelectric sensor 1. For example, after sampling is carried out for a certain period of time in the photoelectric sensor 1, data on all sampled amounts of received light may be transmitted to the setting device 200, and data on each amount of received light may be transmitted to a personal computer from the setting device 200.

A graph display by the foregoing setting device 200 is very useful in the case where a change in the target data compared with a threshold is complex. A specific example will be described with reference to FIGS. 9 and 10.

Figure 9A:
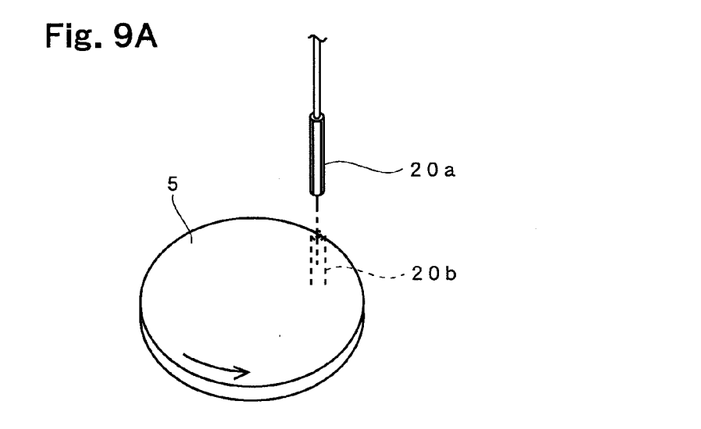
FIG. 9A shows an example of the use of a transmission type photoelectric sensor.
Figure 9B:
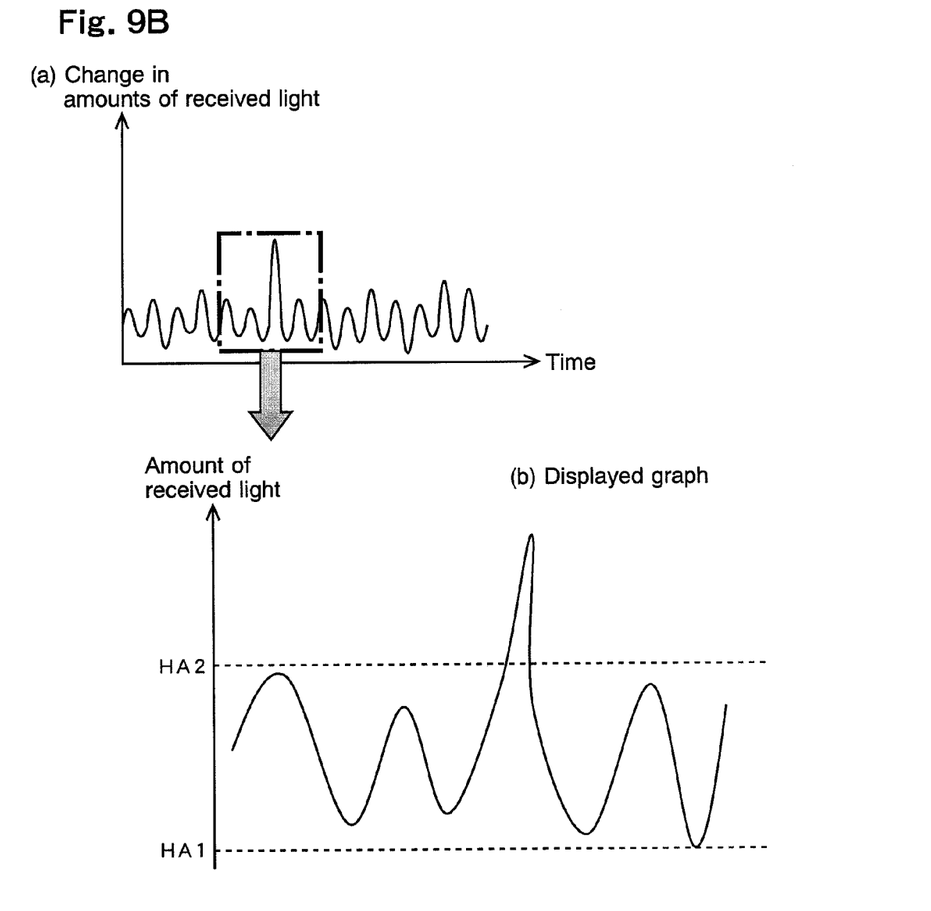
FIG. 9B shows data on an amount of received light by the transmission type photoelectric sensor, and also FIG. 9B includes a view explaining a graph displayed on the basis of sampling data on an amount of received light.

The example shown in FIG. 9 is provided for detecting a nicked edge in a disk-like cutter 5. In the present example, as shown in FIG. 9A, a light-projecting side head portion 20*a* and a light-receiving side head portion 20*b* of a transmission type photoelectric sensor are disposed opposite to each other with the outer edge of the cutter 5 interposed between them. When a nicked edge portion of the cutter 5 is placed between them, an increase in the amount of received light is detected.

The appearance and circuit configuration of the transmission type photoelectric sensor are identical to those shown in FIGS. 2 to 4. Accordingly, components other than the head portions 20*a* and 20*b* are labeled with the same reference numerals used in FIGS. 2 to 4.

A graph (a) in FIG. 9B represents the change in data on the amount of received light input to the control unit of the photoelectric sensor 1 due to the arrangement of the head portions 20*a* and 20*b*. A graph (b) in FIG. 9B is displayed on the monitor 201 of the setting device 200 after the amounts of received light surrounded by a frame in bold in (a) are sampled.

The cutter 5 rotates at high speed, and accordingly, it has been conventionally difficult to detect a change in the amount of received light resulting from the rotation. However, in the present example, data on the amount of received light input to the control unit 100 are limited to a fixed time period, and those amounts of received light are sampled. Subsequently, a graph is formed as shown in FIG. 9B, in which an axis corresponding to time is expanded against the data on the sampled amounts of received light. The graph is then displayed on the monitor 201 in the setting device 200.

Displaying the data in such a manner enables a user to make detailed checks on any changes in data on the amount of received light. In addition, this example specifies the normal range of variation of changes in data on the amount of received light and shows the minimum value HA1 and the maximum value HA2 of the variations, making it easy for the user to find data deviating from the maximum value HA2 of the permissible amount of received light. Accordingly, setting a value greater than HA2 as a threshold prevents variations within a permissible range of the amount of received light from being erroneously detected as a nicked edge, or prevents any amount of received light that corresponds to an abnormal value from being regarded as a permissible value.

Figure 10A:
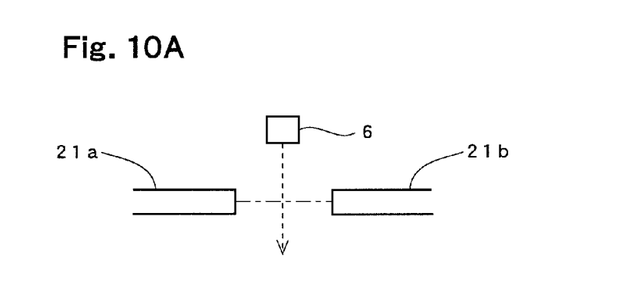
FIG. 10A shows another example of the use of the photoelectric sensor.
Figure 10B:
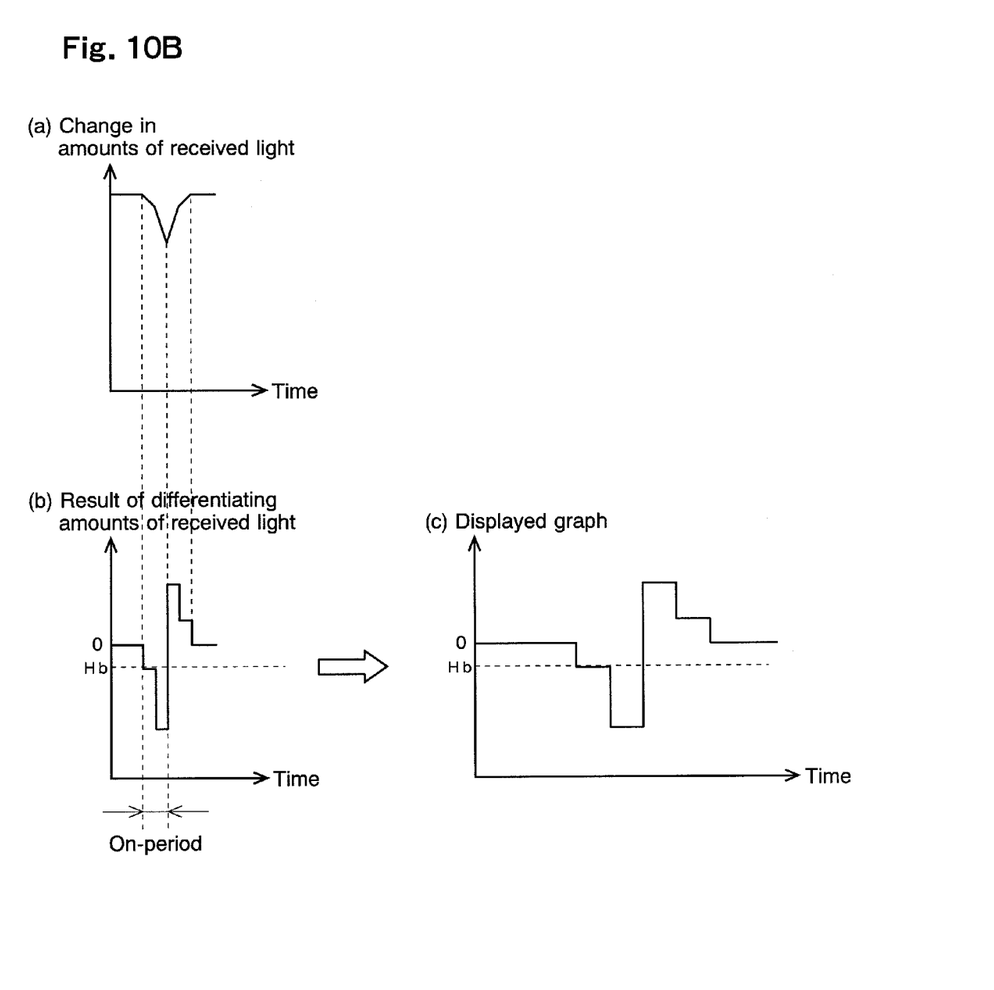
FIG. 10B shows graphs explaining the principle of detecting a detection target by comparing the differential value of an amount of received light with a threshold, and a graph displayed on the basis of the sampling data of the differential value.

An example shown in FIG. 10 uses the transmission type photoelectric sensor 1 for detecting a detection target 6 that is falling. As shown in FIG. 10A, a light-projecting side head portion 21*a* and a light-receiving side head portion 21*b* are disposed opposite to each other with the declining path of the detection target 6 interposed between them.

As the detection target 6 falls, the amount of received light changes rapidly. A control unit 100 of the photoelectric sensor 1 according to the present example differentiates the amounts of received light obtained from the signals indicating these amounts, as shown in graphs (a) and (b) in FIG. 10B. Thereby the control unit 100 detects a gradient in change in the amount of received light, and compares the detected value with a negative threshold Hb. Then, while the gradient in change in the amount of received light decreases below the threshold Hb, the control unit 100 sets the detection signal to an ON-level.

Furthermore, in the present example, instead of data on the amount of received light, the results (b) of the differential operation are stored in the memory. The stored data are sampled and the captured sampling data are displayed on the monitor 201 in the setting device 200 as a graph in which a time-axis is expanded. A graph (c) in FIG. 10B shows a display example of this.

As shown in graphs (b) and (c) in FIG. 10B, the differential values of the data on the amount of received light, detected when a detection target falls, exhibit complex change. Moreover, since the speed of change is high, it has been conventionally difficult to set a threshold appropriate for a reliable detection. Displaying a graph in which a time-axis is expanded, as shown in the graph (c) in FIG. 10B, enables a user to recognize a concrete pattern of data to be compared with a threshold and to determine an appropriate threshold with ease.

In accordance with one aspect of the present invention, a photoelectric sensor is applied includes: a light-projecting unit for projecting light; a light-receiving unit for receiving light projected from the light-projecting unit and generating data on an amount of received light; an output unit for outputting a detection signal indicating that a detection target has been detected; and a signal processing unit for receiving the data on the amount of received light generated by the light-receiving unit, performing a measuring process for the data on the amount of received light, comparing measurement data obtained by the measuring process with a predetermined threshold to determine whether a detection target is present or not, and switching between ON and OFF states of the detection signal according to a result of the determination.

In the foregoing configuration, the light-receiving unit may directly receive light emitted by a light-projecting element (transmission type) or may receive light that is emitted by a light-projecting element and then reflected by an object (reflection type). The signal processing unit performs the measuring process, for example, by measuring every time or every fixed time a datum on an amount of received light, input by the light-receiving unit. Furthermore, the signal processing unit can perform an analyzing process such as calculating a change in an amount of received light per unit time by differentiating the data on the amount of received light, obtained by this measurement, or calculating a moving average of the data on the amount of received light.

To enable a user to easily check measurement data changes caused by the movement of a detection target at high speed, the signal processing unit includes: storage means for storing the data on the amount of received light input from the light-receiving unit or the measurement data captured by the measuring process; sampling means for performing a sampling process in which the data on the amount of received light or the measurement data stored in the storage means are read as sampling data at fixed intervals, the sampling process being performed during a limited reading period; and output means for outputting the sampling data, read by the sampling means, in association with order in which the sampling data are stored in the storage means.

Incidentally, the number of sampling data read by the sampling means may be at least three, but it is preferable that the number be significantly larger than three. For example, it is preferable that the number of sampling data be determined on the basis of sampling intervals or the number of data stored in the storage means within the time taken for a detection target to make a required movement.

According to the foregoing configuration, values of the data on amount of received light, input by the light-receiving unit every time or values of the data (on the amount of received light or on the result of the analysis of amount of received light) measured to compare with the detecting threshold for a detection target are sampled within a certain limited period of time. The values are then output so as to correspond to the order in which the sampling data are stored in the storage means, that is, the order in which the data are generated. Accordingly, even when the actual measurement data change at high speed, the data can be reproduced at a speed such that a user can check this change after the change ended. In addition, a graph can be formed to facilitate checking this change. Hence, the user can easily grasp any change in measurement data.

The processes by the sampling means and the output means may be performed prior to that of setting a threshold for determining a detection target. However, after the threshold has been set, the processes may be performed to check whether the threshold is appropriate or not. The processes can also be used to check whether a detection target has been correctly detected or whether noise is present.

The photoelectric sensor according to an embodiment includes a display unit for digitally displaying values of the sampling data. The output means is configured to serve as means for displaying on the display unit the sampling data to be output in the order in which they are read from the storage means. This enables a user to sequentially check changes in the amount of received light or changes in measurement value resulting from the movement of a detection target.

In an embodiment whose conceptual focus is narrower than that of the foregoing embodiment, the output means is configured such that the sampling data to be output are displayed on the display unit in order and over a time exceeding a time required for these data to be stored in the storage means.

Where a detection target moves at high speed, it is difficult to check changes in the data displayed with the human eyes even when the amount of received light and the measurement value are displayed in real time. In view of this, in the embodiment described above, sampling data to be output are displayed in order and over a time exceeding that required for these data to be stored in the storage means. Accordingly, a user can check changes in the amount of received light or changes in the measurement value which result from movement of a detection target. This makes it easy for the user to check whether movement of a detection target has been correctly detected and to set values such as thresholds.

Another embodiment of the photoelectric sensor including the display unit able to digitally display the values of the sampling data further includes an operating unit for receiving an operation for specifying content of processing. The output means performs: displaying on the display unit the value of a sampling datum to be output first, and then reading from the storage means a sampling datum to be subsequently output each time the operating unit receives an operation commanding the display of the subsequent sampling data; and switching a content displayed on the display unit to the value of the read sampling datum.

According to the embodiment described above, when the sampling process ends, the value of the first sampling datum to be output is displayed on the display unit. Thereafter, a user performs the operation commanding the display of the subsequent sampling datum, thereby displaying the second and subsequent sampling data sequentially on the display unit, thus enabling the user to check each value. Even when the signal of the amount of received light and the measurement data change rapidly as a detection target moves, the sampling data are displayed in such a manner. Accordingly, the user can subsequently check measurement data resulting from the movement of the detection target in detail at his or her own pace. In addition, the sampled measurement data are digitally displayed, enabling a user to easily determine a detailed threshold from these displayed data.

In the embodiment described above, the operating unit may be configured so as to receive an operation commanding the display of a subsequent sampling data and an operation commanding the display of a previous sampling data. Due to this configuration, the output means is configured such that when one of values of second and subsequent sampling data to be output are displayed on the display unit and the operating unit performs an operation commanding the display of the previous display content, the display content is updated by a value of the sampling datum immediately preceding the currently displayed sampling data.

According to the foregoing configuration, a user can check the values of the sampling data in chronological order and can also check past sampling data if necessary. Accordingly, changes in measurement data resulting from movement of the detection target can be checked in more detail.

The photoelectric sensor according to another embodiment includes a display unit for displaying a graph. In addition, the output means reads a plurality of sampling data from the storage means and displays time-series changes in values of these data on the display unit.

According to the foregoing configuration, changes in measurement data resulting from movement of a detection target can be displayed in the form of a graph, making it easier for a user to grasp any changes in measurement data.

The photoelectric sensor according to another embodiment further includes an operating unit for receiving an operation commanding specifying the content of processing, and the output means is configured to serve as means for communicating with an external device that can display a graph. The output means outputs the plurality of sampling data read from the storage means in association with the order in which these sampling data are stored in the storage means.

In accordance with the foregoing aspect, the data sampled by the photoelectric sensor are transmitted to the external device in association with the order in which they are generated. Accordingly, the external device can form and display a graph representing time-series changes in the amount of received light or the measurement values which result from the movement of the detection target, on the basis of the transmitted data. This makes it easier for a user to grasp any changes in the amount of received light or measurement value.

In another embodiment of the photoelectric sensor, the output means analyzes the data stored in the storage means, thereby specifying a period of time that a signal change satisfying a predetermined condition arises, and sets the sampling data included in this period as an output target. Accordingly, for example, by specifying a period of time when data may greatly change, data stored in the storage means during a period of time that the amount of received light or measurement value is highly likely to change in accordance with the movement of the detection target can be sampled and output.

One aspect of the present invention is applied to a method to aid checking of a detecting operation of a photoelectric sensor. The photoelectric sensor includes: a light-projecting unit for projecting light; a light-receiving unit for receiving light projected from the light-projecting unit and generating data on an amount of received light; an output unit for outputting a detection signal indicating that a detection target has been detected; and a signal processing unit for receiving the data on the amount of received light generated by the light-receiving unit, performing a measuring process for the data on the amount of received light, comparing measurement data obtained by the measuring process with a predetermined threshold to determine whether a detection target is present or not, and switching between ON and OFF states of the detection signal according to a result of the determination.

The method includes: operating the photoelectric sensor while a detection target is moving through a detecting area of the photoelectric sensor and simultaneously causing the signal processing unit of the photoelectric sensor to store in a memory data on an amount of received light input from the light-receiving unit or measurement data obtained by the measuring process; and performing a sampling process in which the data on the amount of received light or the measurement data stored in the memory are read as sampling data at fixed intervals, the sampling process being performed during a limited reading period.

The method further includes causing a display unit integrally provided to the photoelectric sensor or a display device externally provided to the photoelectric sensor to display values of the sampling data read from the memory, the values being displayed in association with the order in which these data are stored in the memory.

In the foregoing method, the photoelectric sensor samples the data on the amount of received light during a signal change caused by the movement of the detection target or the measurement data generated by the measuring process for the data on the amount of received light, and the values of the sampling data are subsequently displayed on the display unit of a main body of the photoelectric sensor or an external display device in association with the order in which these data were generated. This enables the display of changes in the amount of received light or changes in the measurement value caused by the movement of a detection target. Accordingly, a user can easily grasp the changes in the amount of received light or in the measurement value caused by the movement of a detection target.

To display such changes on the external display device provided for the photoelectric sensor, sampling data read from the memory may be supplied, through communication means, to a computer controlling the operation of this display device. In addition, the sampling data to be displayed may be read by outputting the sampling data, read from the memory of the photoelectric sensor, to a removable storage medium and then setting this recording medium on an external computer.

Even when data on an amount of received light generated by the light-receiving unit or measurement data to be compared with a threshold provided for detecting an object change at high speed as a result of the movement of the detection target, the embodiments above described enable a user to subsequently check the change in the data easily. This makes it easy to check whether a detection target has been correctly detected or to set a value such as a threshold.

What is claimed is:
1. A photoelectric sensor comprising:
a light-projecting unit for projecting light;
a light-receiving unit for receiving light projected from the light-projecting unit and generating data on an amount of received light;
an output unit for outputting a detection signal indicating that a detection target has been detected; and
a signal processing unit for receiving the data on the amount of received light generated by the light-receiving unit, performing a measuring process on the data to quantify the amount of received light, comparing measurement data obtained by the measuring process with a predetermined threshold to determine whether a detection target is present or not, switching between ON and OFF states according to a result of the determination, and storing the measured received light data when in an ON state, wherein the signal processing unit includes:
a memory that stores the data on the amount of received light input from the light-receiving unit or the measurement data captured by the measuring process during ON periods;
an ON period identification part for identifying when the stored data on the amount of received light reaches a threshold level to trigger an ON state,
the data from the ON state taken in which the detection signal is in an ON state judged by the comparing process using the threshold level; and
an output part that outputs the data stored during the ON period, in association with the order in which the data are stored in the memory.

2. The photoelectric sensor according to claim 1, further comprising a display unit for digitally displaying values of the data stored during the ON period, and wherein
the output part is configured to display on the display unit the data stored during the ON period to be output in the order in which the data stored during the ON period are read from the memory.

3. The photoelectric sensor according to claim 2, wherein the output part is configured such that the data stored during the ON period to be output are displayed on the display unit in order and over a time exceeding a time required for the data to be stored in the memory.

4. The photoelectric sensor according to claim 2, further comprising an operating unit for receiving an operation for specifying content of processing, and wherein
the output part performs: displaying on the display unit the value of a datum of the data stored during the ON period to be output first, and then reading from the memory a datum of the data stored during the ON period to be subsequently output each time the operating unit receives an operation commanding the display of the subsequent data stored during the ON period; and switching a content displayed on the display unit to the value of the read datum of the data stored during the ON period.

5. The photoelectric sensor according to claim 4, wherein the operating unit is configured so as to receive an operation commanding the display of a subsequent data stored during the ON period and an operation commanding the display of a previous data stored during the ON period, and wherein
the output part is configured such that when one of values of second and subsequent data stored during the ON period to be output are displayed on the display unit and the operating unit performs an operation commanding the display of the previous display content, the display content is updated by a value of the datum of the data stored during the ON period immediately preceding the currently displayed data stored during the ON period.

6. The photoelectric sensor according to claim 1, further comprising a display unit for displaying a graph, and wherein
the output part reads a plurality of data stored during the ON period from the memory and displays time-series changes in values of the data on the display unit.

7. The photoelectric sensor according to claim 1, further comprising an operating unit for receiving an operation commanding specifying the content of processing, and wherein
the output part is configured to communicate with an external device that can display a graph, the output part outputting a plurality of data stored during the ON period read from the memory in association with the order in which the data stored during the ON period are stored in the memory.

8. The photoelectric sensor according to claim 1, wherein the output part analyzes the data stored in the memory, thereby specifying a period of time that a signal change satisfying a predetermined condition arises, and sets the data stored during the ON period included in the period as an output target.

9. The photoelectric sensor according to claim 1, wherein the signal processing unit, when in a pre-set period after the ON state, stores the measured received light data; wherein the memory stores the data on the amount of received light input from the light-receiving unit or the measurement data captured by the measuring process for the pre-set period after the ON state; and the output part outputs data stored during the pre-set period after the ON state; wherein a duration of the pre-set period is less than a duration of the OFF state.

10. The photoelectric sensor according to claim 9, wherein the duration of the pre-set period is set by a user.

11. A method for aiding checking of a detecting operation of a photoelectric sensor, the photoelectric sensor including: a light-projecting unit for projecting light; a light-receiving unit for receiving light projected from the light-projecting unit and generating data on an amount of received light during an ON period; an output unit for outputting a detection signal indicating that a detection target has been detected; and a signal processing unit for receiving the data on the amount of received light generated by the light-receiving unit, performing a measuring process on the data on the amount of received light, comparing measurement data obtained by the measuring process with a predetermined threshold to determine whether a detection target is present or not, and switching between ON and OFF states of the detection signal according to a result of the determination,
the method comprising:
operating the photoelectric sensor while a detection target is moving through a detecting area of the photoelectric sensor and simultaneously causing the signal processing unit of the photoelectric sensor to store, in a memory, data on an amount of received light input from the light-receiving unit or measurement data obtained by the measuring process during ON periods;
performing an ON period when the amount of received light input from the light-receiving unit exceeds a threshold value;
performing a measuring process in which the data on the amount of received light is stored at fixed intervals; and
causing a two dimensional display unit integrally provided to the photoelectric sensor or a two dimensional display device externally provided to the photoelectric sensor to display values of the data read from the memory during an ON period, the values being displayed in association with the order in which the data are stored in the memory, thereby creating a two dimensional plot of the measured light intensity over a single ON period.

* * * * *